Figure 1:
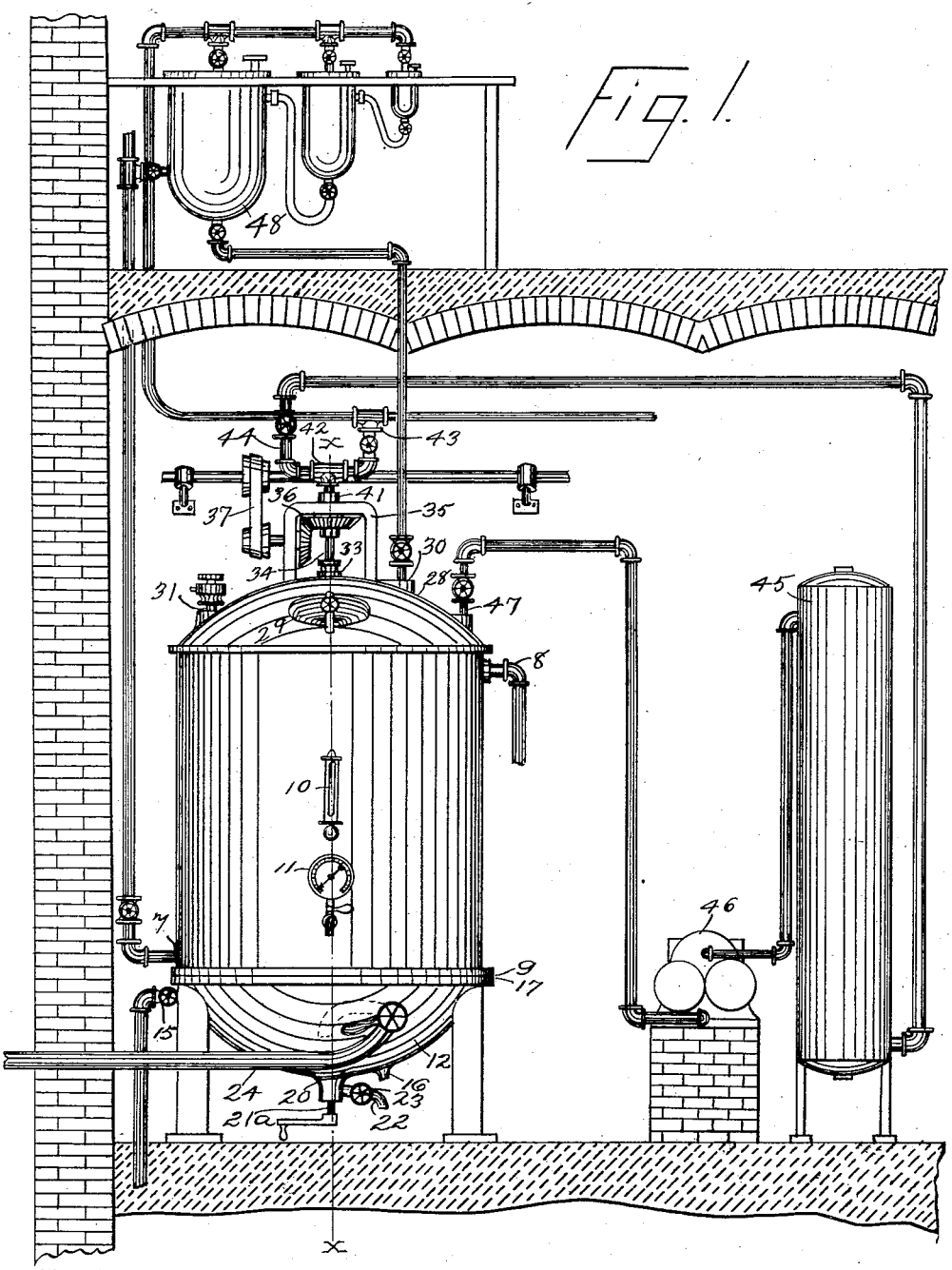

No. 734,985. PATENTED JULY 28, 1903.
C. SPINDLER.
APPARATUS FOR CONVERTING WORT INTO BEER.
APPLICATION FILED MAY 5, 1902.
NO MODEL. 2 SHEETS—SHEET 1.

WITNESSES
INVENTOR
Charles Spindler.
BY
Edgar Tate & Co
ATTORNEYS

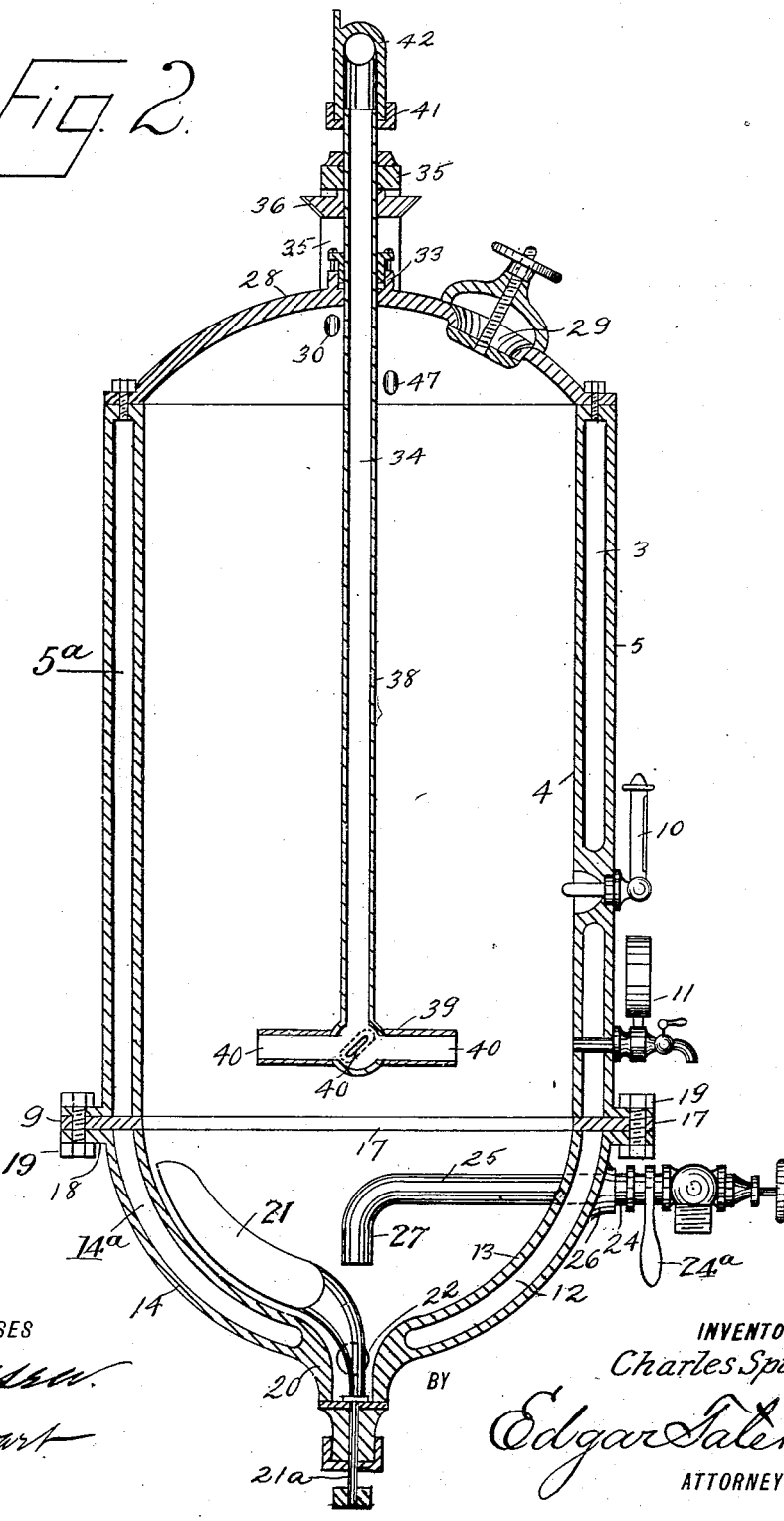

No. 734,985. Patented July 28, 1903.

UNITED STATES PATENT OFFICE.

CHARLES SPINDLER, OF JERSEY CITY, NEW JERSEY.

APPARATUS FOR CONVERTING WORT INTO BEER.

SPECIFICATION forming part of Letters Patent No. 734,985, dated July 28, 1903.

Application filed May 5, 1902. Serial No. 105,929. (No model.)

*To all whom it may concern:*

Be it known that I, CHARLES SPINDLER, a citizen of the United States, residing at Jersey City, in the county of Hudson and State of New Jersey, have invented certain new and useful Improvements in Apparatus for Converting Wort into Beer, of which the following is a full and complete specification, such as will enable those skilled in the art to which it appertains to make and use the same.

This invention relates to improved apparatus for the manufacture of fermented liquors, particularly beer; and it has for its object to provide an improved apparatus of this class which shall be superior from a standpoint of continuity and efficiency of operation, comparative simplicity in construction, compactness in form, and in the obviation of the use of a number of separate apparatuses the use of which is customarily incidental to processes involving the employment of apparatus of this class.

In another application for Letters Patent filed simultaneously herewith, Serial No. 105,930, filed May 5, 1902, I have described the improved process involved in the use of the apparatus which constitutes the subject-matter of the present application.

The invention is fully disclosed in the following specification, of which the accompanying drawings form a part, in which the separate parts of my improvement are designated by the same reference characters in each of the views, and in which—

Figure 1 is a side elevation of my improved apparatus, showing the same installed in operative arrangement; and Fig. 2, a central vertical sectional view of the essential features of the said apparatus, taken upon the line *x x* of Fig. 1.

Referring to the drawings, my improved apparatus embodies a cylindrical casing 3, comprising an inner shell 4 and an outer shell or jacket 5, which shells or jackets are preferably cast or otherwise formed integrally, and between the shells or jackets 4 and 5 is an annular space or chamber $5^a$, adapted to receive a cooling medium, such as brine.

The jacket 5 is provided with a suitable inlet 7 and an outlet 8 for brine or other cooling substance or medium and is also flanged at its bottom, as at 9. The interior wall of the shell 4 is preferably enameled.

Mounted in the casing 3 is a thermometer 10 and a pressure-gage and test-cock 11, which are led through the jacket 5 and arranged exteriorly of the casing 3 in convenient position. The casing 3 is provided with a bottom member 12, which is enameled upon its interior wall and comprises an inner shell 13 and an outer steam-jacket 14, provided with a steam connection 15 and a condensed-water outlet 16, and between the shell 13 and jacket 14 is a space or chamber $14^a$, adapted to receive steam which is used as a heating medium. The said bottom member 12 is connected with the main casing 3, preferably by means of a soft aluminium gasket 17, the bottom member or casing 12 being flanged outwardly, as at 18, to correspond with the flange 9 of the casing 3, which flanges 9 and 18 are suitably connected, as at 19, and the gasket 17 separates the spaces or chambers $5^a$ and $14^a$.

The casing 12 is provided with an upwardly-flaring bottom portion 20, within which is revolubly mounted a yeast-scoop 21, operated by a cranked shaft $21^a$ and which conforms in its general formation to the formation of the inner wall or shell 13 and is of a suitable crescent formation to cause a general agitation of the yeast within the casing or bottom member 12 toward the center of the same. The casing 12 is provided at the base of the same with a yeast-outlet 22, provided with stop-cock or valve 23.

At the side of the casing or bottom member 12 is arranged a beer-outlet and wort-inlet tube 24, which embodies a bent tube 25, preferably of aluminium, which can be turned in a stuffing-box 26, so that the inner vertically-arranged end portion 27 of the same may be disposed in varying altitudes as desired, and the tube 24 is provided with a handle $24^a$, by which it may be turned, and it will be understood that the parts 24, 25, and 27 together constitute the beer-outlet and the wort-inlet and all turn together, as will be readily understood.

The top member of the casing 3 consists of a single convex upwardly-curved shell 28, which is also preferably enameled upon its inner wall and provided with a manhole 29, a yeast-charging inlet 30, a safety-valve 31, a $CO_2$ outlet at 47, and a stuffing-box 33, in which an agitator 34 is mounted for revolution centrally within the casing 3. Mounted on said top member 28 is a frame or support 35, in which is mounted beveled gearing 36, whereby through the medium of operating means 37, of any preferred type, the agitator 34 may be revolved. The agitator 34 embodies a hollow shaft 38, provided at its lower end, within the casing 3, with a plurality of wings or blades 39, which are of hollow formation, communicating with the interior of the shaft 38 and provided with openings 40, through which the sterilized air and the $CO_2$ are discharged within the casing 3.

At the upper end of the shaft 38 is provided a stuffing-box 41, in which it revolves, and a header 42 is connected with said stuffing-box in communication with the hollow shaft 38 and communicating at one end, as at 43, with the sterilized-air supply and at the other end, as at 44, with the $CO_2$ supply 45.

The blades 39 of the agitator 34 are preferably set diagonally or out of the horizontal plane, so as to create a thorough agitation of the contents of the casing 3 in the revolution of the agitator and so as to cause a continuous interchange of positions or intermingling of the contents of the casing 3, and thus effect a quicker cooling or sterilizing of the wort, as well as to agitate the wort and yeast in a thorough manner.

The enameling of the several parts, as before set forth, produces acid-proof surfaces which are not affected by the various substances coming in contact with the same and will, furthermore, withstand the various changes of temperature. The agitator, the beer-outlet pipe, and the yeast-scoop are preferably formed of aluminium or of an alloy of aluminium and nickel, although any metallic composition or alloy heavily silver-plated can be used with satisfactory results.

The $CO_2$ may be stored in a suitable tank, as at 45, communicating with the $CO_2$ inlet 44, said tank being charged by a compressor 46, to which the $CO_2$ may return from the casing 3 from a $CO_2$ connection 57, arranged in the top member 28 of the casing 3.

The yeast is supplied through the yeast connection 30 from a suitable pure-yeast cultivation plant or supply 48, of the usual or any preferred construction. Suitable pipings may connect the several parts of the apparatus, according to any desired scheme or any desired installation of the apparatus.

In the operation of this apparatus I take the wort from the hop-jack in as hot a condition as possible and place the same in the casing 3, in which the said wort is cooled by brine passing through the chamber 5$^a$, and to avoid a vacuum, as well as to aerate the wort to the required extent, I agitate the wort by means of the agitator 34, at the same time introducing or supplying sterilized air. If any doubt exists as to the purity of the wort, I sterilize the same before sowing it with the yeast, which may be from six to twenty-four hours after it is placed in the casing 3, and then cool the wort again to a temperature of from about 40° to 60° Fahrenheit. If the wort is unquestionably pure, I sow the same as soon as cooled without sterilizing with yeast from the pure-yeast cultivating plant 48, which may be of any form or construction and the details of which are not shown and described. After the wort is charged or sown with yeast I operate the agitator 34 periodically or about every three hours, the periods of agitation and rest being preferably equal and being each about three hours in duration. The object of this intermittent agitation is to avoid settling or precipitation of the yeast to or at the bottom of the casing 3 in the state of rest or in the formation of lumps and rather to have the germs work in the most productive or increasing or germinating way, so as to complete the fermentation within three or four days. For two-thirds of this period of time I keep the safety-valve set at about four pounds' pressure, and during the latter third of the period I close the safety-valve and collect the generated $CO_2$ and store the same for carbonizing or resaturating purposes, and the foregoing operation constitutes a method of forced fermentation. As soon as the pressure decreases when the yeast is worked out or the attenuation has reached the proper degree I stop the agitator and let the yeast settle to the bottom. After settling I may remove the yeast by means of the yeast-scoop 21 and the outlet 22, or when I have sufficient vessels on hand I can force the beer into an empty vessel by means of an air-pressure or $CO_2$ pressure, using the adjustable beer-outlet 24, by means of which the beer may be drawn or removed from the extreme bottom of the apparatus or from a point or points higher up. During the fermenting period I cool the fermented wort gradually to about 34° Fahrenheit on the fourth day and maintain a low temperature during the remainder of the process. On the fifth day I charge the wort with $CO_2$ at a pressure of about five pounds, gradually raising the pressure to about fifteen pounds, though always blowing off on the safety-valve in order to remove the young bouquet or green flavor and working the agitator continuously, and this aging or resaturating process can be accomplished either after the removal of the yeast or in another vessel. At the end of the sixth day, if necessary, I can rack off the beer into packages, though I prefer to keep the beer until the ninth day under pressure before it is racked off for the market.

Having fully described my invention, what I claim as new, and desire to secure by Letters Patent, is—

1. An apparatus of the class described, comprising a closed jacketed casing having a closed jacketed bottom whereby spaces or chambers are formed between the body of the casing and the jacket thereof and between the body of the bottom and the jacket thereof, said chambers or spaces being separated; a yeast-inlet, a $CO_2$ outlet, and a safety-valve connected with the top of said casing; a yeast-outlet connected with the bottom of said casing; a beverage-outlet and wort-inlet connected with the bottom of said casing; and a yeast-scoop in the bottom of said casing and adapted to be operated from beneath the same, substantially as shown and described.

2. An improved apparatus of the class described, comprising a closed jacketed casing having a closed jacketed bottom whereby spaces or chambers are formed between the body of the casing and the jacket thereof and between the body of the bottom and the jacket thereof; a yeast-inlet, and a $CO_2$ outlet, connected and a safety-valve also connected with the top of said casing; a yeast-outlet connected with the bottom of said casing; an adjustable beverage-outlet and wort-inlet connected with the bottom of said casing; a yeast-scoop within the bottom of said casing and adapted to be operated from beneath the same; said jacketed casing being also provided with means for supplying a cooling medium thereto at the bottom thereof; means for removing said cooling medium at the top thereof; a thermometer, and a pressure-gage; and the bottom member being also provided with means for admitting a heating member thereto and removing said heating medium therefrom, substantially as shown and described.

3. An apparatus of the class described comprising a closed jacketed casing having a closed jacketed bottom whereby spaces or chambers are formed between the body portion of the casing and the jacket thereof and between the body portion of the bottom and the jacket thereof, said chambers or spaces being separated; a yeast-inlet, a $CO_2$ outlet, and a safety-valve connected with the top of said casing; and a beverage-outlet connected with the bottom of said casing, substantially as shown and described.

In testimony that I claim the foregoing as my invention I have signed my name, in presence of the subscribing witnesses, this 2d day of May, 1902.

CHARLES SPINDLER.

Witnesses:
    F. A. STEWART,
    F. F. TELLER.